(12) United States Patent
Harihara et al.

(10) Patent No.: US 9,429,361 B2
(45) Date of Patent: Aug. 30, 2016

(54) SYSTEMS AND METHODS FOR ADAPTIVE MICROWAVE DRYING OF CERAMIC ARTICLES

(71) Applicant: CORNING INCORPORATED, Corning, NY (US)

(72) Inventors: Parasuram Padmanabhan Harihara, Corning, NY (US); Meng Li, Ames, IA (US)

(73) Assignee: Corning Incorporated, Corning, NY (US)

(*) Notice: Subject to any disclaimer, the term of this patent is extended or adjusted under 35 U.S.C. 154(b) by 717 days.

(21) Appl. No.: 13/686,179

(22) Filed: Nov. 27, 2012

(65) Prior Publication Data
US 2014/0144040 A1 May 29, 2014

(51) Int. Cl.
| F26B 7/00 | (2006.01) |
| B28B 11/24 | (2006.01) |
| B28B 17/00 | (2006.01) |
| F26B 3/347 | (2006.01) |
| F26B 25/22 | (2006.01) |

(52) U.S. Cl.
CPC ............ *F26B 7/002* (2013.01); *B28B 11/241* (2013.01); *B28B 11/243* (2013.01); *B28B 17/0081* (2013.01); *F26B 3/347* (2013.01); *C04B 2235/606* (2013.01); *C04B 2235/6025* (2013.01); *F26B 25/22* (2013.01); *F26B 2210/02* (2013.01)

(58) Field of Classification Search
CPC ............... B28B 11/241; B28B 11/243; B28B 17/0081; C04B 2235/606; C04B 2235/6025; F26B 2210/02; F26B 25/22; F26B 7/002
USPC ........................................................ 34/259
See application file for complete search history.

(56) References Cited

U.S. PATENT DOCUMENTS

| 3,166,663 | A | * | 1/1965 | Fritz | ........................ | H05B 6/78 219/699 |
| 3,365,562 | A | * | 1/1968 | Jeppson | ................... | H05B 6/76 219/699 |
| 3,787,985 | A | | 1/1974 | Fowler et al. | | |

(Continued)

FOREIGN PATENT DOCUMENTS

DE 37 41 128 6/1988

OTHER PUBLICATIONS

Tikhonovich, A.S., et al., Abstract, RU2327095C1, published Jun. 20, 2008.

(Continued)

*Primary Examiner* — Kenneth Rinehart
*Assistant Examiner* — Logan Jones
(74) *Attorney, Agent, or Firm* — Joseph M. Homa; Matthew B. McNutt

(57) ABSTRACT

Methods of reducing transient temperature variations in a microwave drying process for drying partially dried ceramic logs are disclosed. The methods include sending the logs through an output microwave dryer having multiple applicators, each applicator being capable of generating an adjustable amount of microwave power. A transient drying model is employed based on microwave-drying process parameters to determine a predicted log exit temperature at the output end of the output microwave dryer. The exit temperature of each log is measured. The transient drying model, which is used to control the amount of microwave power applied, is adjusted based on a difference between the predicted and measured log exit temperatures.

3 Claims, 7 Drawing Sheets

(56) References Cited

U.S. PATENT DOCUMENTS

| | | | | |
|---|---|---|---|---|
| 3,858,022 A * | 12/1974 | Smith | ................. | H05B 6/782 219/699 |
| 4,072,492 A * | 2/1978 | Castine, Jr. | ............ | C03B 29/08 65/103 |
| 4,180,918 A * | 1/1980 | Ostrowski | ................ | B22C 9/12 34/259 |
| 4,282,998 A * | 8/1981 | Peekna | ................ | B65H 23/24 226/196.1 |
| 4,771,153 A | 9/1988 | Fukushima et al. | ... | 219/10.55 B |
| 4,963,709 A | 10/1990 | Kimrey, Jr. | .......... | 219/10.55 M |
| 4,982,347 A * | 1/1991 | Rackerby | ................ | G05D 23/22 219/482 |
| 5,214,442 A | 5/1993 | Roller | .......................... | 346/1.1 |
| 5,813,134 A | 9/1998 | Min et al. | ...................... | 34/255 |
| 5,837,978 A | 11/1998 | Hatzakis, Jr. et al. | ........ | 219/702 |
| 6,172,346 B1 * | 1/2001 | Wroe | ...................... | B01J 19/126 219/681 |
| 6,233,841 B1 * | 5/2001 | Beach | ...................... | A23L 3/54 34/203 |
| 6,247,246 B1 | 6/2001 | Scalese et al. | ................. | 34/259 |
| 6,259,078 B1 | 7/2001 | Araya | .......................... | 219/709 |
| 6,455,826 B1 * | 9/2002 | Araya | ................ | B28B 11/243 219/699 |
| 6,618,957 B2 * | 9/2003 | Novak | ...................... | A61L 2/12 34/259 |
| 6,713,738 B2 * | 3/2004 | Yau | ........................ | H05B 6/806 219/678 |
| 6,768,089 B2 * | 7/2004 | Minobe | .................... | H05B 6/78 219/699 |
| 6,863,919 B1 | 3/2005 | Mäenpää et al. | ................. | 427/8 |
| 7,087,874 B2 * | 8/2006 | Ishikawa | ................ | B28B 3/206 219/701 |
| 8,020,314 B2 * | 9/2011 | George | ................ | B28B 11/241 219/463.1 |
| 8,481,900 B2 * | 7/2013 | Pitsakis | ................ | B28B 11/241 219/700 |
| 2002/0046474 A1 * | 4/2002 | Novak | ..................... | A61L 2/12 34/259 |
| 2004/0173142 A1 * | 9/2004 | Willis | ..................... | F27B 14/00 117/200 |
| 2007/0151147 A1 * | 7/2007 | Learey | .................... | C10B 57/04 44/620 |
| 2009/0283517 A1 * | 11/2009 | Mackay | ................. | H05B 6/782 219/700 |
| 2009/0294440 A1 * | 12/2009 | Adrian | .................... | F26B 3/347 219/750 |
| 2010/0052197 A1 | 3/2010 | Deneka et al. | ............. | 264/40.4 |
| 2010/0107435 A1 * | 5/2010 | George | ................ | B28B 11/241 34/259 |
| 2010/0108667 A1 * | 5/2010 | Harihara | .................. | H05B 6/68 219/704 |
| 2011/0120991 A1 * | 5/2011 | Armenta Pitsakis | . | B28B 11/241 219/702 |
| 2012/0049415 A1 * | 3/2012 | George | ................ | H05B 6/686 264/432 |

OTHER PUBLICATIONS

Itaya, Y., et al., "Internal heating effect and enhancement of drying of ceramics by microwave heating with dynamic control", Transport in Porous Media, vol. 66, No. 1-2, Jan. 2007, p. 29-42.

Patent Cooperation Treaty International Notification of Transmittal of the International Search Report and the Written Opinion of the International Searching Authority, international application No. PCT/US2013/071129; mailing date Feb. 5, 2014, 9 pages.

* cited by examiner

SYSTEMS AND METHODS FOR ADAPTIVE MICROWAVE DRYING OF CERAMIC ARTICLES

FIELD

This disclosure is related to microwave drying of ceramic articles, and in particular relates to adapted microwave drying methods that improve the start-up of the drying process.

BACKGROUND

Certain types of ceramic-based articles, such as engine exhaust system substrates and filters, are formed by the extrusion of a ceramic batch material. The extruded ceramic batch material constitutes an extrudate called a "log." Upon exiting the extruder, the log has a high moisture content and so needs to be dried so that it can be further processed to form the final ceramic-based article.

One approach to drying logs involves using microwave power. This drying is usually accomplished by passing the log through a series of microwave dryers or "applicators." Each applicator is set to supply what is believed to be the requisite microwave power to dry the log as the log passes through the applicator from an input side to an output side.

However, due to vagaries of the extrusion process, a pre-determined microwave-power drying profile can often result in substantial temperature variability over the log during the drying process, in particular at the start of the drying process when the power profile has not yet been optimized for the product being dried. Such temperature variability not only induces unwanted chemical reactions within the log but also adversely affects the log shape, which in turn adversely affects the ceramic article being manufactured. In particular, log-shape variations can cause the resulting ceramic article to fall outside of its shape tolerance limits.

Consequently, the process has to be manually adjusted using trial and error to get the drying process to reach a steady state where the temperature over the entirety of the log is close to a desired target temperature. This manual process can take anywhere from 30 minutes to 15 hours, depending primarily on the particular ceramic batch composition and the experience of the operators.

SUMMARY

An aspect of the disclosure is a method of reducing transient temperature variations in a microwave drying process for drying partially dried ceramic logs. The method includes sending the logs through at least one output microwave dryer having an input end, an output end and multiple applicators, with each applicator capable of generating an adjustable amount of microwave power. The method also includes applying the adjustable amount of microwave power to the logs. The method further includes employing a transient drying model based on microwave-drying process parameters to determine a predicted log exit temperature $T_{PE}$ at the output end of the at least one output microwave dryer. The method additionally includes measuring an exit temperature $T_M$ of each log as the logs exit the output end of the at least one output microwave dryer. The method also includes adjusting the transient drying model to adjust the amount of adjustable microwave power applied to the logs based on a difference between the predicted log exit temperature $T_{PE}$ and the measured exit temperature $T_M$.

Another aspect of the disclosure is a method of reducing transient temperature variations in a microwave drying process for drying partially dried ceramic logs having an intermediate temperature $T_I$. The method includes sending the logs through at least one output microwave dryer having an input end, an output end and multiple applicators that are each capable of generating an adjustable amount of microwave power. The method also includes employing a transient drying model based on microwave-drying process parameters to determine a predicted log exit temperature $T_{PE}$ at the dryer output end. The method further includes measuring an exit temperature $T_M$ of each log as the logs exit the output end of the at least one output microwave dryer. The method additionally includes comparing a target log exit temperature $T_{TE}$ to the predicted log exit temperature $T_{PE}$ to define a first temperature difference $\Delta T = T_{PE} - T_{TE}$. The method also includes comparing the measured log exit temperature $T_M$ to the predicted log exit temperature $T_{PE}$ to define a second temperature difference $dT = T_{PE} - T_M$. The method further includes adjusting the amount of microwave power provided by at least one of the applicators based on the first and second temperature differences $\Delta T$ and $dT$ so that a log temperature $T_R$ at a pack-off position remains within a select temperature band around a target temperature $T_T$.

Another aspect of the disclosure includes a method of reducing transient temperature variations in a microwave drying process for drying partially dried ceramic logs. The method includes sending the logs through at least one output microwave dryer having an input end, an output end, a last applicator and a second-to-last applicator, with each of the applicators being capable of generating an adjustable amount of microwave power. The method includes applying the adjustable amount of microwave power to the logs using at least one of the last applicator and the second-to-last applicator, the adjustable amount being controlled by a controller operably connected to the last applicator and the second-to-last applicator. The method also includes employing a transient drying model embodied in a computer-readable medium of the controller and, based on microwave-drying process parameters, determining a predicted log exit temperature $T_{PE}$ at the output end of the at least one output microwave dryer. The method further includes measuring an exit temperature $T_M$ of each log as the logs exit the output end of the at least one output microwave dryer and providing to the controller the measured temperature exit temperature as a measured temperature signal representative of the measured exit temperature $T_M$. The method additionally includes adjusting the transient drying model being run on the controller to determine a change in the amount of adjustable microwave power applied to the logs to reduce a difference between the predicted log exit temperature $T_{PE}$ and the measured exit temperature $T_M$. The method also includes changing the amount of adjustable microwave power by the determined amount using the controller.

It is to be understood that both the foregoing general description and the following Detailed Description represent embodiments of the disclosure and are intended to provide an overview or framework for understanding the nature and character of the disclosure as it is claimed. The accompanying drawings are included to provide a further understanding of the disclosure and are incorporated into and constitute a part of this specification. The drawings illustrate various embodiments of the disclosure and together with the description serve to explain the principles and operations of the disclosure.

Additional features and advantages of the disclosure are set forth in the Detailed Description that follows, and in part will be readily apparent to those skilled in the art from that description or recognized by practicing the disclosure as described herein, including the Detailed Description that follows, the claims and the appended drawings.

The claims as set forth below are incorporated into and constitute a part of the Detailed Description set forth below.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

Figure 1:
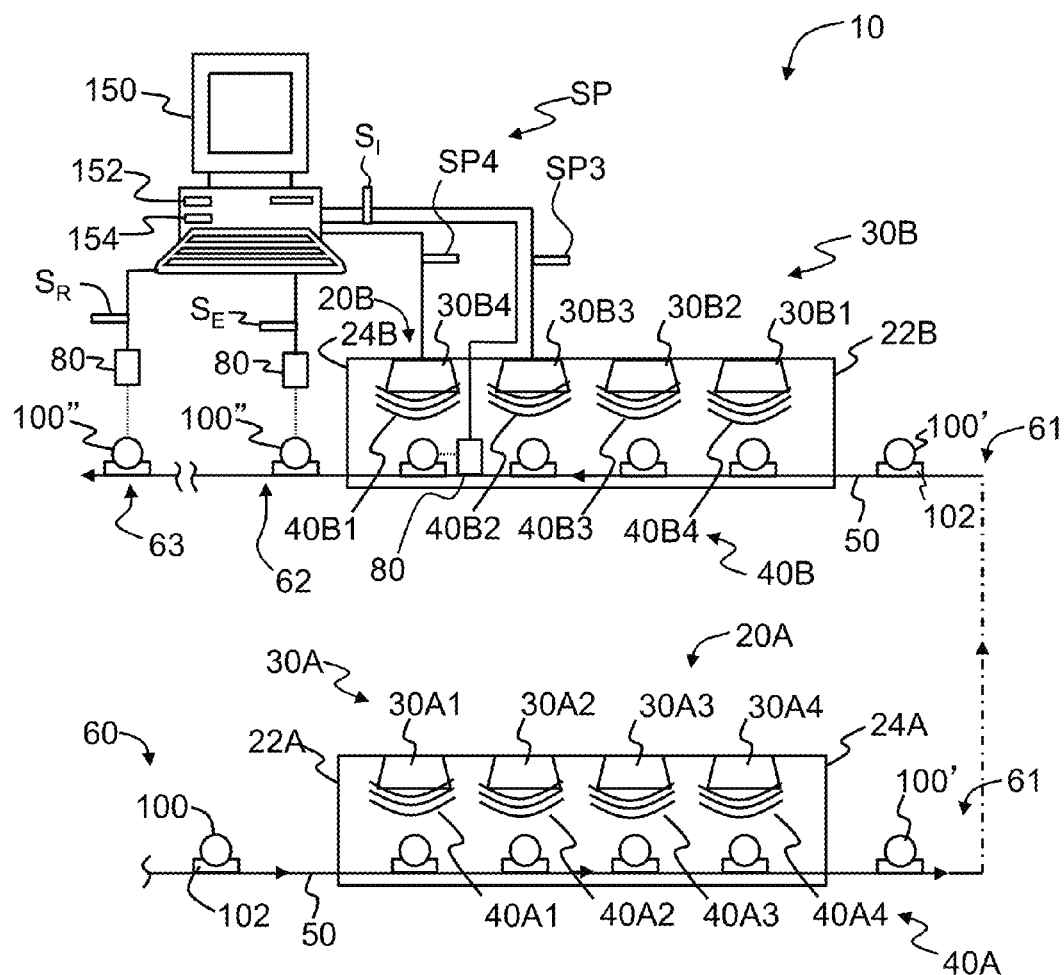
FIG. 1 is a schematic diagram of an example microwave drying system suitable for carrying out the disclosed microwave drying methods.

FIG. 1 is a schematic diagram of an example microwave drying system ("system") 10 that includes a first dryer 20A and a second dryer 20B. The first dryer 20A has an input end 22A and an output end 24A, while second dryer 20B has an input end 22B and an output end 24B. The first dryer 20A includes an interior 26A and a plurality of applicators 30A, with four applicators 30A1, 30A2, 30A3 and 30A4 shown by way of example. Likewise, second dryer 20B includes an interior 26B and a plurality of applicators 30B, with four applicators 30B1, 30B2, 30B3 and 30B4 shown by way of example. Each applicator 30A and 30B is configured to generate corresponding microwaves 40A (i.e., 40A1, 40A2, 40A3, 40A4) and 40B (i.e., 40B1, 40B2, 40B3, 40B4) into their respective interiors 26A and 26B. The applicators 30B3 and 30B4 respectively constitute the second-to-last applicator and the last applicator in second dryer 20B.

Figure 4:
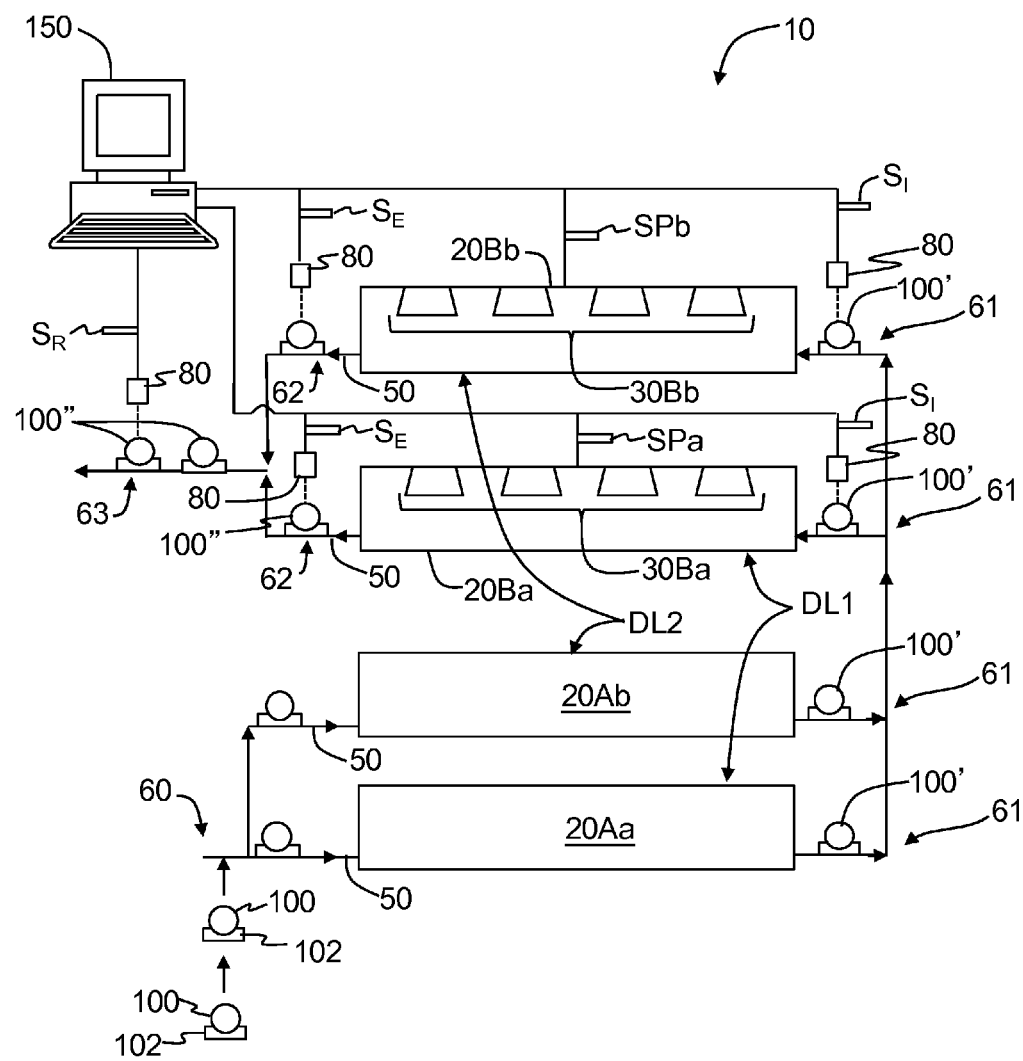
FIG. 4 is a schematic diagram of an embodiment of the microwave drying system of FIG. 1, wherein the system includes two microwave drying lines that operate in parallel and where the two drying lines share a pack-off position.

In system 10, first dryer 20A can be considered an "input" dryer and second dryer 20B can be considered an "output" dryer. Other dryer configurations for system 10 are contemplated, such as a configuration that includes one or more "intermediate" dryers that lie between input and output dryers 20A and 20B. Also, multiple input dryers 20A can be arranged to operate in parallel, and multiple output dryers 20B can be arranged to operate in parallel. An example of such a configuration of system 10 is shown in FIG. 4 and is discussed below. Further, the use of four applicators 30 in each input dryer 20A and output dryer 20B is by way of illustration, and fewer or more of the applicators can be used in either dryer.

The system 10 includes a conveyor 50 that has an input position 60. The conveyor 50 runs through interior 26A of first dryer 20A and through interior 26B of second dryer 20B to an output or exit position 62 and then to a pack-off position 63. The conveyor 50 is configured to move logs 100 formed from an extruded ceramic material. The logs 100 are supported on trays 102. The input position 60 is where trays 102 receive logs 100 from the extruder (not shown). The pack-off position 63 is where dried logs 100" are removed from conveyor 50 for further processing. The system 10 also includes an intermediate position 61 between dryers 20A and 20B and along conveyer 50 wherein logs 100 are partially dried, and these logs are denoted by reference number 100'. The exit position 62 is where dried logs 100" exit output end 24B of second dryer 20B. The conveyor 50 thus moves dried logs 100" from exit position 62 to pack-off position 63. During this transition, the temperatures of dried logs 100" necessarily decrease from an exit log temperature $T_E$ to a pack-off position temperature $T_R$.

The system 10 includes first, second and third temperature sensors 80, which in an example can disposed at the input to applicator 30B4, at output end 24B of dryer 20B (i.e., exit position 62), and at pack-off position 63, respectively. One of the temperature sensors 80 can also be disposed at intermediate position 61 (see, e.g., FIG. 4). The first temperature sensor 80 measures intermediate temperatures $T_I$ of partially dried logs 100' at the input to applicator 30B4 and in response generates first temperature signals $S_I$, which are representative of the measured intermediate temperatures. This is an example and is shown by way of illustration, as temperatures from other input locations, such as locations adjacent the input to applicator 30B3 or 30B2 or the intermediate position 61, can also be used. Likewise, second temperature sensor 80 measures exit log temperatures $T_E$ of dried logs 100" as they exit dryer 20B at exit position 62 adjacent output end 24B. The second temperature sensor 80 generates temperature signals $S_E$, which are representative of the measured exit temperatures $T_E$. The third temperature sensor 80 measures the aforementioned temperatures $T_R$ of dried logs 100" at pack-off position 63 and generates temperature signals $S_R$, which are representative of pack-off temperature $T_R$. Example temperature sensors 80 are pyrometers, such as laser-based pyrometers.

The system 10 further includes a controller 150 operably connected to applicators 30B of dryer 20B and to temperature sensors 80. The controller 150 is configured to control the activation of applicators 30B4 and 30B3 by respective power signals SP4 and SP3, which control the amount of microwave power 40B1 and 40B2 emitted by these applicators.

An example controller 150 is a computer (such as a microcomputer) that includes a processor unit ("processor") 152 and a memory unit ("memory") 154 and is configured to control the operation of system 10. In an example, controller 150 is or includes a computer and includes a device, for example, optically based drives (not shown), or any other digital device including a network-connecting device such as an Ethernet device (not shown) for reading instructions and/or data from a computer-readable medium, such as flash memory, optical storage devices, or other digital sources such as a network or the Internet, as well as yet-to-be-developed digital means. The computer executes instructions stored in firmware.

The controller 150 is programmable to perform the functions described herein, including the operation of system 10 to control the microwave drying process. As used herein, the term "computer" or "controller" is not limited to just those integrated circuits referred to in the art as computers but broadly refers to computers, processors, microcontrollers, microcomputers, programmable logic controllers, application-specific integrated circuits and other logic circuits, and these terms are used interchangeably herein.

Software may implement or aid in performing the drying control functions and methods disclosed herein as controlled by controller 150, including the performance of calculations relating to regression models, transient drying models and transient-drying-model adaptations, as described below. The software may be operably installed in controller 150 or in processor 152. Software functionalities may involve programming, including executable code, and such functionalities may be used to implement the methods disclosed herein. Such software code is executable by the general-purpose computer or by the processor unit described below.

In operation, the code and possibly the associated data records are stored within a general-purpose computer platform, within the processor unit, or in local memory. At other times, however, the software may be stored at other locations and/or transported for loading into the appropriate general-purpose computer systems. Hence, the embodiments discussed herein involve one or more software products in the form of one or more modules of code carried by at least one machine-readable medium. Execution of such code by a processor of the computer system or by the processor unit enables the platform to implement the catalog and/or software-downloading functions in essentially the same manner as in the embodiments discussed and illustrated herein.

The controller 150 may employ a computer-readable medium or machine-readable medium, which refers to any medium that participates in providing instructions to a processor for execution, including, for example, determining how much microwave power each applicator 30 should generate. The memory 154 and processor 152 constitute a computer-readable media. Such a media may take many forms, including but not limited to non-volatile media, volatile media and transmission media. Non-volatile media include, for example, optical or magnetic disks, such as any of the storage devices in any computer(s) operating as one of the server platforms discussed above. Volatile media include dynamic memory, such as main memory of such a computer platform. Physical transmission media include coaxial cables, copper wire and fiber optics, including the wires that comprise a bus within a computer system.

In the general operation of system 10, conveyer 50 moves logs 100 through first dryer 20A, with applicators 30A1 through 30A4 generating microwave power 40A1 through 40A4 to partially dry the logs. This results in partially dried logs 100' residing at intermediate position 61 between first and second dryers 20A and 20B. While controller 150 can be operably connected to applicators 30A1 through 30A4, these applicators can also be operated independent of applicators 30B of second dryer 20B and also manually adjusted.

The temperatures $T_I$ of partially dried logs 100' are measured at a location adjacent the input of applicator 30B4 using first temperature sensor 80. The corresponding temperature signals $S_I$ are sent to controller 150. The controller 150 controls the amount of microwave power 40B1 and 40B2 via respective power signals SP (i.e., SP4 and SP3), as explained in greater detail below. The power signals SP are used to create the power profile P(t) defined for a given applicator 30B.

The second temperature sensor 80 measures the exit log temperatures $T_E$ at exit position 62 and sends to controller 150 the corresponding temperature signal $S_E$, which also includes a predicted exit temperature $T_{PE}$ for logs 100" and a target log temperate $T_T$, as well as upper and lower temperature limits $T_U$ and $T_L$ around the target log temperature. The upper and lower temperature limits $T_U$ and $T_L$ define a temperature range $\delta T = T_U - T_L$ around target log temperature $T_T$.

The system 10 is configured to carry out methods of drying partially dried logs 100' in second dryer 20B in a manner that reduces drying transients. Drying transients are variations in log temperature that occur during microwave drying and cause the drying process to take a relatively long time to become stable, i.e., cause the log temperature to remain within a threshold temperature range around target log temperature $T_T$.

Figure 2A:
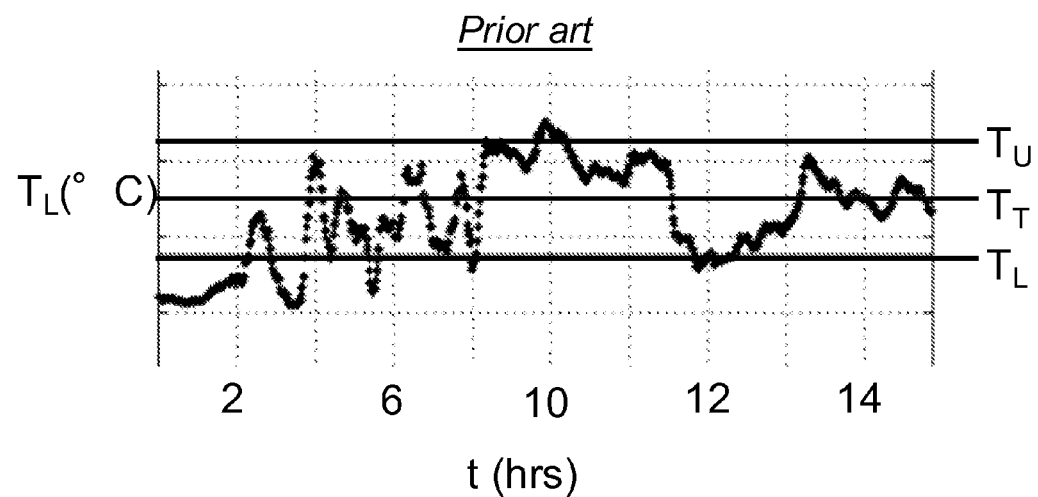
FIGS. 2A and 2B plot the measured log temperature $T_L$ (° C.) versus time (hours) for logs made of two different conventional ceramic materials, where the log was dried using prior-art microwave drying methods, with the two plots showing drying transients prior to the log reaching a steady-state log temperature.

FIG. 2A is a plot of measured log temperature $T_L$ (° C.) versus time (hours) for a log 100 made of a ceramic material, where the log was dried using prior-art microwave drying methods. The centerline is the target log temperature $T_T$, while the upper and lower lines are the upper and lower temperature limits $T_U$ and $T_L$.

The plot of FIG. 2A shows that the drying process took an inordinately long time to reach steady-state operation wherein the log exit temperatures $T_E$ are close to the desired target temperature $T_T$. The log temperature drying transients before the drying process reaches the steady state are unacceptably large, and they greatly delay convergence to steady-state drying. This results in unwanted delays in producing ceramic articles.

Figure 2B:
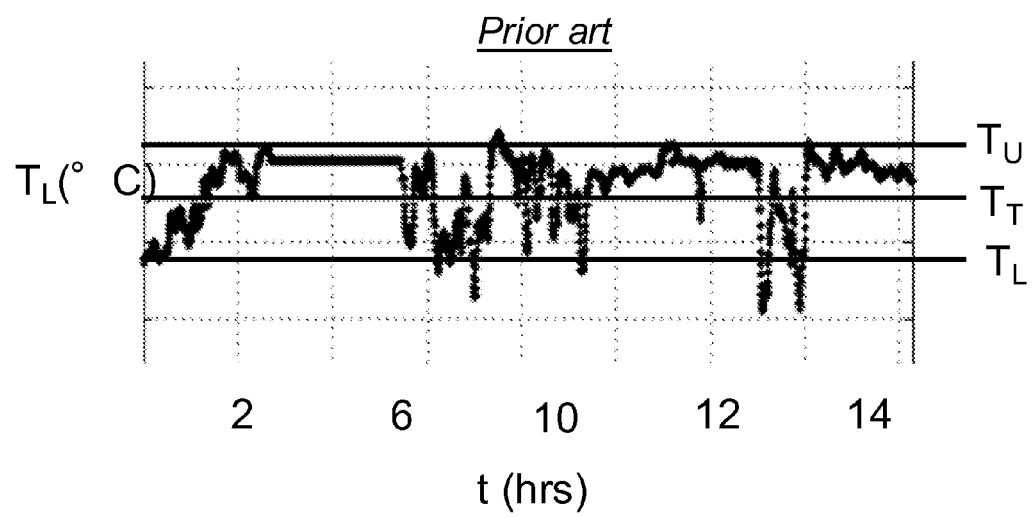

FIG. 2B is similar to FIG. 2A and plots the measured exit log temperatures $T_E$ for another example conventional ceramic material composition used to make an emission after-treatment system. In this case, the drying process again took a very long time to reach steady-state operation wherein the log exit temperatures $T_E$ are not necessarily close to the desired target temperature $T_T$ but are at least stable and consistent. The log temperature drying transients before the process reaches steady-state are unacceptably large, and they greatly delay convergence to steady-state drying. This results in unwanted delays in producing ceramic articles.

Figure 3:
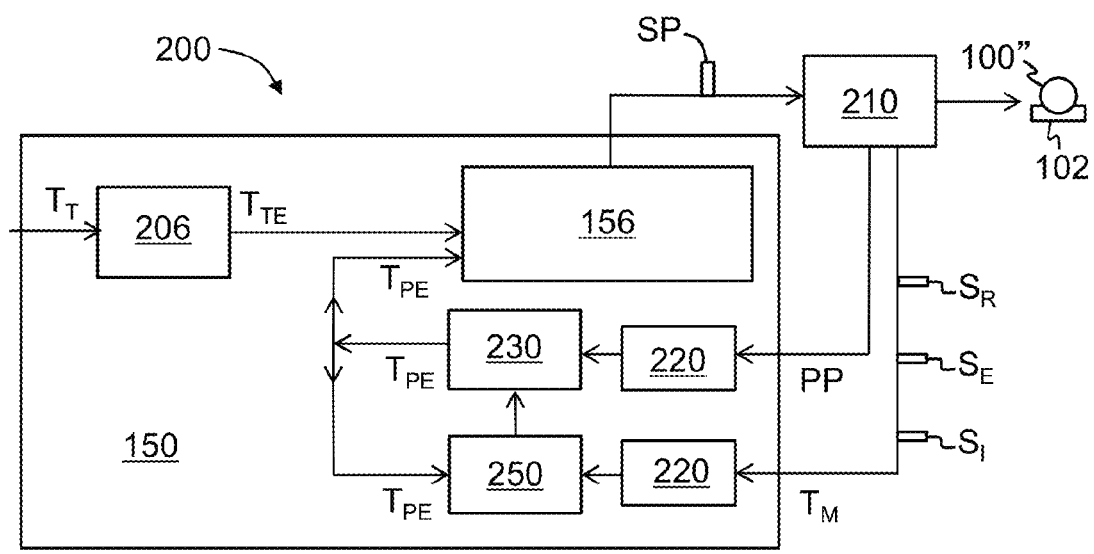
FIG. 3 is a combined system/flow diagram of an example control process for drying logs with reduce drying transients according to the disclosure.

FIG. 3 is a combined system/flow diagram that illustrates an example reduced-transient drying control process ("control process") 200 for drying partially dried logs 100'. The control process 200 is managed by controller 150, which is shown in the control process as including (e.g., running) a regression model 206 and feeding the results into a drying process 210. The drying process 210 is carried out by applicators 30B3 and 30B4. The amounts of microwave power 40B2 and 40B1 respectively generated by applicators 30B3 and 30B4 are actively controlled by power control signals SP (i.e., SP3 and SP4) from an applicator controller 156 in controller 150.

The drying process 210 also has associated therewith a number of process parameters PP, such as log temperatures $T_I$ at a location adjacent the input of applicator 30B4, the maximum power in applicator 30B4 corresponding to the maximum allowable load inside the applicator, the load given by the number of logs 100' inside the applicator. The process parameters PP pass through a first filter 220, which reduces the measurement- and process-related noise in the signals SP. The filtered process parameters PP are then inputted into a transient drying model 230, which yields a predicted log exit temperature $T_{PE}$. Meanwhile, the drying process 210 also produces an actual measured exit temperature $T_M$ for dried logs 100" at output end 24B of second dryer 20B (i.e., at exit position 62) via second temperature sensor 80 and corresponding temperature signal $S_E$ (see FIG. 1). This measured log temperature $T_M$ is passed through a second filter 220, which reduces the measurement- and process-related noise in the signal $S_E$.

The filtered measured log temperature $T_M$ is then provided to a transient-drying-model correction factor 250. The transient-drying-model correction factor 250 also receives the predicted log exit temperature $T_{PE}$ from transient drying model 230. The transient-drying-model correction factor 250 is an adaptation mechanism that allows transient drying model 230 to be changed during the drying process based on the amount of error in (i.e., the difference between) measured log temperature $T_M$ versus the predicted log exit temperature $T_{PE}$. The predicted log exit temperature $T_{PE}$ is inputted into applicator controller 156 of controller 150 along with target exit temperature $T_{TE}$ as determined by regression model 206.

The general operation of control process 200 is based on predicting exit log temperature $T_{PE}$ using transient drying model 230 and comparing this temperature to target log exit temperature $T_{TE}$ to assess the temperature difference $\Delta T$. The temperature difference $\Delta T$ is then used to determine the amount of microwave power 40 that needs to be applied by applicator controller 156 in order to make measured log exit temperature $T_M$ closer to target log exit temperature $T_{TE}$. If measured log exit temperature $T_M$ is closer to target log exit temperature $T_{TE}$, then based on regression model 206, it can be ensured that the pack-off position temperature $T_R$ will also be closer to target log temperature $T_T$. Since transient drying model 230 is based on certain assumptions as described below, transient-drying-model correction factor 250 is used to account for any model inaccuracies based on the error (difference) between the actual measured log temperature $T_M$ and predicted log exit temperature $T_{PE}$ and provide the necessary corrections to the transient drying model.

The control process 200 has as one of its goals driving the microwave drying process to stable operation (i.e., to a substantially constant pack-off position temperature $T_R$ within upper and lower limit temperatures $T_U$ and $T_L$ around target temperature $T_T$) as fast as possible in order to reduce or eliminate the need for manual adjustment of system 10. The predicted log exit temperature $T_{PE}$ is based on intermediate log temperature $T_I$ and process parameters PP. The correction to microwave power profile P(t) can be applied well in advance to counter the deviation of pack-off position temperatures $T_R$ from target log temperature $T_T$.

Transient Drying Model

The transient drying model 230 is a lumped-parameter model based on first principles of microwave drying of ceramic-based extruded logs 100. The transient drying model 230 has as its purpose tracking trends in log temperature rather than tracking the log temperatures themselves to a fraction of a degree. Based on the conservation of power inside log 100, the microwave-drying-process model of the change in temperature T and dryness D with time of a given log 100 (the $k^{th}$ log) can be written as:

$$\frac{dT_k}{dt} = \begin{cases} \frac{p_{k\_dissipated}}{C_{p\_wet} \cdot w_k} & T_k < T_e \\ 0 & T_k = T_e \\ \frac{p_{k\_dissipated}}{C_{p\_dry} \cdot w_k (1 - R_{H_2O})} & T_k > T_e \end{cases} \quad \text{(Eq. 1)}$$

$$\frac{dD_k}{dt} = \begin{cases} 0 & T_k < T_e \\ \frac{p_{k\_dissipated}}{H_v \cdot w_k \cdot R_{H_2O}} & T_k = T_e \\ 0 & T_k > T_e \end{cases} \quad \text{(Eq. 2)}$$

where, $T_k$ and $D_k$ are log temperature and dryness for log k, respectively, $p_{k\_dissipated}$ is the microwave dissipation power on log k, $w_k$ is the initial mass of the log k and $C_{p\_wet}$ and $C_{p\_dry}$ are the heat capacities of log k when it is wet and dry, respectively. Also, $H_v$, is the specific latent heat of vaporization of water, $R_{H_2O}$ is the batch water fraction by mass percent, and $T_e$ is the evaporation temperature of water.

The transient drying model 230 is based on the following assumptions:
1. Water evaporates at a specific temperature $T_e$.
2. Heat transfer between the log and its surrounding environment is negligible.
3. The loss of microwave power to the surrounding environment, such as dryer walls, the conveyor belt, adjacent logs, etc., is negligible.

The system 10 and the drying methods using the system as disclosed herein are directed to controlling the log temperature drying transients as logs 100' transition from a partially dried state to a final dried state to form dried logs 100" so that Eq. (2) is not required. Moreover, system 10 and its associated methods seek to adjust microwave power profiles P(t) (i.e., the time-evolution of microwave power 40B for applicators 30B3 and 30B4, i.e., $P_3(t)$ and $P_4(t)$) by varying power signals SP to control final (exit) log temperatures $T_E$. This allows for a modified version of the third part of Eq. (1) to be used based on the assumption that partially dried logs 100' are sufficiently dry by the time they reach applicator 30B4 for an increase or decrease of microwave power 40B1 to directly affect the log temperatures. That is to say, the temperature of logs 100' is greater than the evaporative temperature of water. This allows for the microwave drying process to be controlled during the latter stages of the drying process, e.g., in second (output) dryer 20B. In other examples, the drying control process is applied to multiple output dryers 20B that follow multiple input or intermediate dryers.

The amount of microwave power 40B applied by each applicator 30B in the microwave drying process carried out in system 10 is a function of the load presented to each applicator. The load is defined by the size, shape, number, mass, water content and chemical composition of logs 100' in second dryer 20B. If the load presented to a given applicator 30B is at its maximum, then the applied microwave power 40B is at the maximum power set point ($P_{max}$) as determined by the power profile calculations.

Because the load of a given applicator 30B changes, the amount of microwave power 40B applied by each applicator 30B is a fraction of maximum power set point $P_{max}$. Hence the power absorbed by each log 100' is indirectly a function of maximum power set point $P_{max}$. The simplest approximation of this function is a linear function of the form:

$$p_{k\_dissipated} = k'P_{max} + k'', \tag{Eq. 3}$$

where k' and k'' are constants determined based on optimization technique.

Substituting Eq. (3) in the third part of Eq. (1) and integrating over the time it takes for log 100' to pass from the inlet to the exit of applicator 30B4 of dryer 20B yields:

$$T_k^{exit} = T_k^{initial} + \frac{k'P_{max} + k''}{C_{p\_dry} \cdot w_k \cdot (1 - R_{H_2O})} h, \tag{Eq. 4}$$

where $T_k^{exit}$ is the exit temperature ($T_E$) of the $k^{th}$ log, $T_k^{initial}$ is the initial temperature ($T_I$) of the $k^{th}$ log, and h is the time the log takes to travel through applicator 30B4 of dryer 20B.

Rearranging the terms of Eq. (4) results in the following expression.

$$T_k^{exit} = T_k^{initial} + K_1 P_{max} + K_1' \tag{Eq. 5}$$

The parameter $K_1$ is obtained using historical microwave-log-drying data and analyzing the change in log temperature differences for a given change in maximum power set point $P_{max}$. However, the parameter $K_1'$ can be difficult to obtain. The transient drying model 230 is therefore approximated as:

$$\hat{T}_k^{exit} = K_1 \times P_{max} + T_k^{initial} + K_2, \tag{Eq. 6}$$

where $\hat{T}_k^{exit}$ is the predicted exit temperature ($T_{PE}$) for log k, $T_k^{initial}$ is the initial temperature of log k before the log enters the last applicator 30B (e.g., 30B4) and $P_{max}$ is the maximum power set point for the last applicator. The parameter $K_2$ is the model correction factor and is defined as:

$$K_2(q+1) = K_2(q) + K_2'\left[\frac{1}{n}\left(\sum_{i=nq-n+1}^{nq} T_i^{meas}\right) - \frac{1}{n}\left(\sum_{i=nq-n+1}^{nq} \hat{T}_i^{exit}\right)\right], \tag{Eq. 7}$$

where q is the sample number, $T^{meas}$ is the measured log temperature ($T_E$) at the exit of the drying line, n is the number of logs 100' to average and $K_2'$ is a constant.

The transient drying model 230 needs to accurately account for the initial and exit temperature measurements $T_I$ and $T_E$ from first and second temperature sensors 80. In an example, temperature-sensor measurement errors can be divided into two categories: bias errors and random errors. Bias errors can be addressed in a straightforward manner, whereas addressing random errors is more problematic. Eqs. (6) and (7) above are thus modified as follows to account for the bias error in the pyrometer measurements.

From Eq. (6), the exit temperature $T_E$ of the first log can be defined as:

$$\hat{T}_1^{exit} = K_1 \times P_{max}^{initial} + T_1^{initial} + K_2^1 \tag{Eq. 8}$$

Subtracting Eq. (8) from Eq. (6), the following equation is obtained:

$$\Delta \hat{T}_k^{exit} = K_1 \times \Delta P_{max} + \Delta T_k^{initial} + K_3, \tag{Eq. 9}$$

where $$\Delta \hat{T}_k^{exit} \equiv (\hat{T}_k^{exit} - \hat{T}_1^{exit}) \tag{Eq. 10A-10C}$$

$$\Delta P_{max} \equiv (P_{max}^{current} - P_{max}^{initial})$$

$$K_3(q+1) = K_3(q) + K_4\left[\frac{1}{n}\left(\sum_{i=nq-n+1}^{nq} \Delta T_i^{meas}\right) - \frac{1}{n}\left(\sum_{i=nq-n+1}^{nq} \Delta \hat{T}_i^{exit}\right)\right]$$

Eq. 9 and 10A-10C define the developed transient drying model 230. The parameter $K_1$ is obtained using historical data for microwave log drying obtained during the production process for forming ceramic articles. From Eq. (9), $K_1$ can be defined as the change in the exit log temperature $T_E$ for a unit change in the maximum power set point. For this application, $K_4$ is equal to 1 and n is chosen to be equal to 5.

Historical product data was analyzed to obtain the parameter $K_1$. The parameter $K_3$ defines the transient-drying-model correction factor 250 (see FIG. 3). It represents a built-in adaptation mechanism for modifying transient drying model 230 to account for any model inaccuracies relative to the production reality as reflected in the historical production data.

Table 1 below sets forth example values of parameter $K_1$ for different product families (i.e., ceramic batch materials).

TABLE 1

| Product Family | $K_1$ |
| --- | --- |
| Product A | 2.2 |
| Product B | 0.8 |
| Product C | 0.6 |

Regression Model

FIG. 4 is a schematic diagram of an example system 10 similar to FIG. 1, except that the system includes two input dryers 20A (i.e., 20Aa and 20Ab) that operate in parallel and two output dryers 20B (i.e., 20Ba and 20Bb) that operate in parallel. The conveyor 50 receives logs 100 at input position 60 and distributes the logs between the two input dryers 20Aa and 20Ab. The partially dried logs 100' that exit the two input dryers 20Aa and 20Ab at respective intermediate positions 61 are then conveyed to the two output dryers 20Ba and 20Bb and are distributed between the two output dryers. The outputted dried logs 100'' that exit the two output dryers 20Ba and 20Bb at respective output ends 24B are conveyed from the corresponding exit positions 62 to pack-off position 63. Thus, system 10 has two drying lines DL1 and DL2, with drying line DL1 constituted by input and output dryers 20Aa and 20Ba and drying line DL2 constituted by input and output dryers 20Ab and 20Bb.

The regression model 206 allows for system 10 to distinguish between the two drying lines DL1 and DL2. The regression model 206 is used to define target temperature $T_{TE}$ at output end 24B (i.e., exit position 62) of each drying line DL1 and DL2. It defines the relationship between a target log temperature $T_{TR}$ at pack-off position 63 and target log temperature $T_{TE}$ at exit position 62 of each drying line DL1 and DL2.

The temperature measurements of dried logs 100" at exit positions 62 of the two drying lines DL1 and D12 define the log exit temperatures $T_E$ of the particular drying line.
The regression model 206 has the form:

$$T_{exit}^{target} = K' \times T_{pack\text{-}off}^{target} + K'', \quad (Eq.\ 11)$$

where $T_{exit}^{target}$ is the target temperature ($T_{TE}$) at exit position 62 of each drying line DL1 and D12, $T_{pack\text{-}off}^{target}$ is the desired target temperature ($T_T$) at pack-off position 63 and K' and K" are the model parameters. Historical production data is used to determine the model parameters K' and K".

Figure 5:
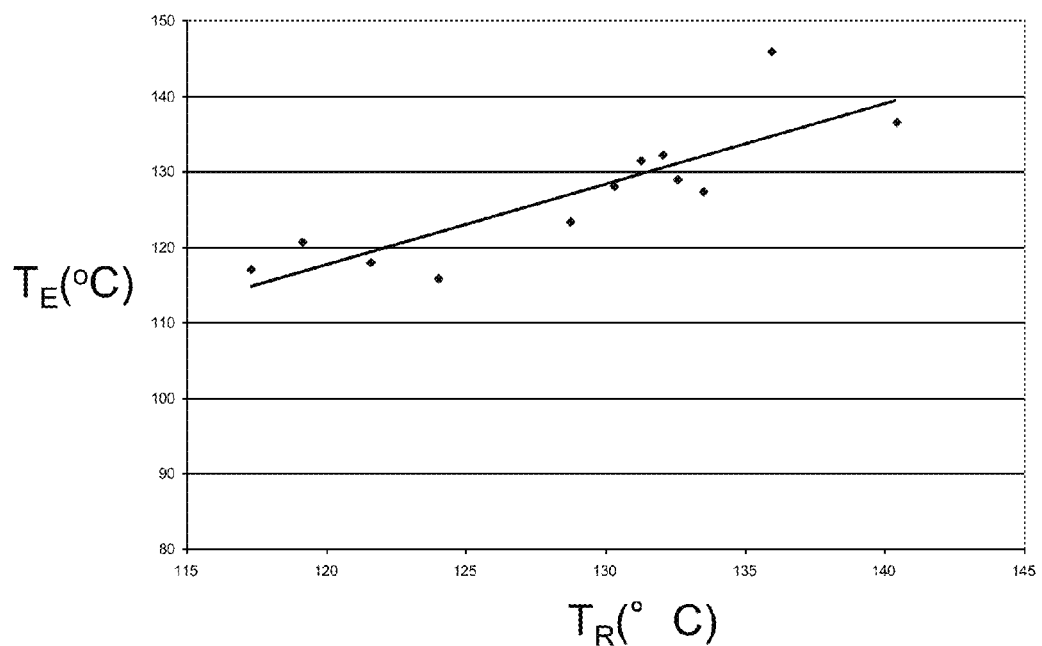
FIG. 5 is a plot of data of the measured exit temperature $T_E$ (° C.) versus the measured temperature $T_R$ (° C.) at the pack-off position, along with a best-fit line through the data.

FIG. 5 is a plot of log exit temperature $T_E$ (° C.) of dried log 100" at exit position 62 versus temperature $T_R$ (° C.) of dried log 100" at pack-off position 63. The solid line through the points is a best-fit line to the data as defined by $T_E = (1.0681) \cdot T_S - 10.61$, with an $R^2$ value of 0.7221. The regression model 206 is used only to convert target log temperature $T_T$ at pack-off position 63 to target log temperature $T_{TE}$ at output end 24B of output dryer 20B. Thus, any error in regression model 206 is considered only once in control process 200.

To further mitigate the impact of any error in regression model 206, in an example embodiment, control process 200 is configured to drive the measured log pack-off position temperatures $T_R$ to be within a specific band around target log temperature $T_T$ rather than exactly the target temperature. One of the reasons for a low $R^2$ value in the plot of FIG. 5 is the location of temperature sensors 80 with respect to logs 100". The temperature sensors 80 at exit position 62 and pack-off position 63 measure the log temperatures at different locations in the logs 100". A better (higher) $R^2$ value can be obtained by ensuring that the measurement location and the location of the corresponding temperature sensors 80 are substantially the same.

Table 2 below sets forth example values for K' and K" for different product families (batch materials) and the different drying lines DL1 and DL2.

TABLE 2

| Material ↓ | Drying line DL1 | | Drying line DL2 | |
| --- | --- | --- | --- | --- |
| | K' | K" | K' | K" |
| Product A | 0.37815 | 76.023 | 0.8217 | 22.101 |
| Product B | 0.5968 | 55.244 | 1.0681 | −10.61 |
| Product C | 0.9952 | 3.6837 | 0.8864 | 17.333 |

Controller

In an example, controller 150 is configured to drive log pack-off position temperatures $T_R$ to within the tolerance band of width $\Delta T$ centered on desired target temperature $T_T$. Using the regression model 206, the target log temperature $T_R$ at pack-off position 63 is converted to the target log temperature $T_{TE}$ at exit position 62 of drying line DL1. The log exit temperature $T_E$ is predicted using process parameters PP and transient drying model 230. This predicted log exit temperature $T_{PE}$ is compared to the measured log exit temperature $T_M$, and the error (difference) dT between the measured log exit temperature and the predicted log exit temperature is used as the input to the transient-drying-model correction factor 250.

The output of applicator controller 156 is the amount by which microwave power 40B must be adjusted to compensate for the error (difference) $\Delta T$ between the predicted log exit temperature $T_{PE}$ and the target log exit temperature $T_{TE}$. In an example, applicator controller 156 operates as a proportional controller. There are two main benefits to having applicator controller 156 operate in this manner. The first is that it is simple to maintain. The second is that parameter $K_1$ of transient drying model 230 determines the change in log temperature for a unit change in applied microwave power 40B. So the reciprocal of $K_1$ determines the amount of microwave power 40B required to obtain a unit change in the log temperature. Thus, the reciprocal of parameter $K_1$ of transient drying model 230 is used as the proportional gain of applicator controller 156.

An example applicator controller 156 thus has the form:

$$\text{Controller} = \frac{1}{K_1} \quad (Eq.\ 12)$$

The predicted temperature error (difference) $\Delta T$ between the model-predicted exit log temperature $TP_E$ and the target exit log temperature $T_{TE}$ is multiplied by proportional control of applicator controller 156 to give the amount of the change in applied microwave power 40B required to compensate for predicted temperature error (difference) $\Delta T$. To make applicator controller 156 operate conservatively, in an example embodiment power signals SP outputted by applicator controller 156 are equally distributed in the last two applicators 30B4 and 30B3 of output dryer 20B. This is done to mitigate any adverse impact of the assumption that logs 100' are almost dry before they reach the last applicator 30B4 in output dryer 20B.

Figure 6:
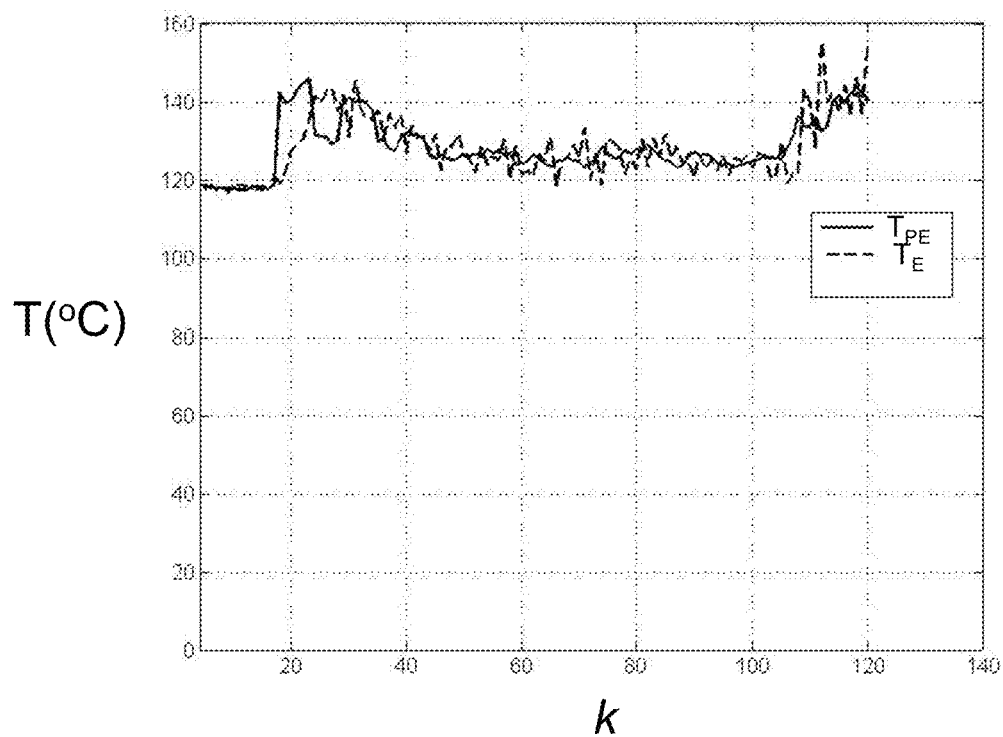
FIG. 6 is a plot of the log number k versus temperature T (° C.) that shows the measured log exit temperature $T_E$ based on microwave-drying production data and the predicted log exit temperature $T_{PE}$ as predicted by the transient drying model.

FIG. 6 is a plot of log number k versus temperature T(° C.) and shows the predicted log exit temperature $T_{PE}$ along with the measured log exit temperature $T_E$ for production data. Based on multiple validation data sets, the mean error (difference) between the predictions of transient drying model 230 and the measurements is only about 3.5° C. This supports use of transient drying model 230 in control process 200 to make the microwave drying process of system 10 more automated and therefore structured, consistent and reliable.

Figure 7A:
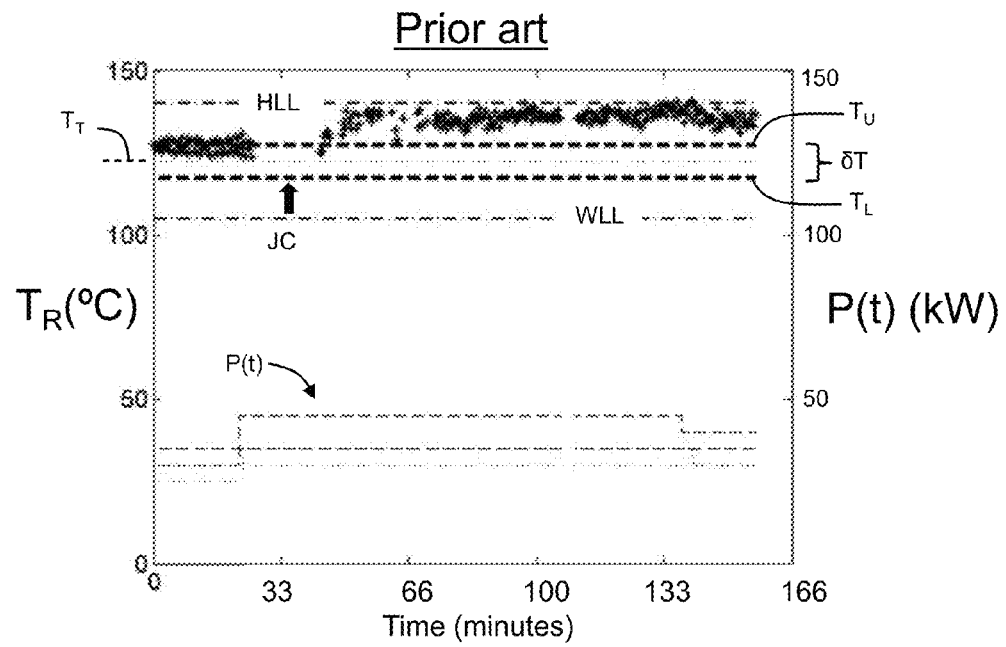
FIG. 7A plots the measured pack-off log temperature $T_R$ (° C.) (left vertical axis) and the microwave power profile P(t) (right vertical axis) for a prior-art microwave-drying process, illustrating how the log temperature never reaches a steady state as defined by the target band based on manual adjustment of the microwave power profile.
Figure 7B:
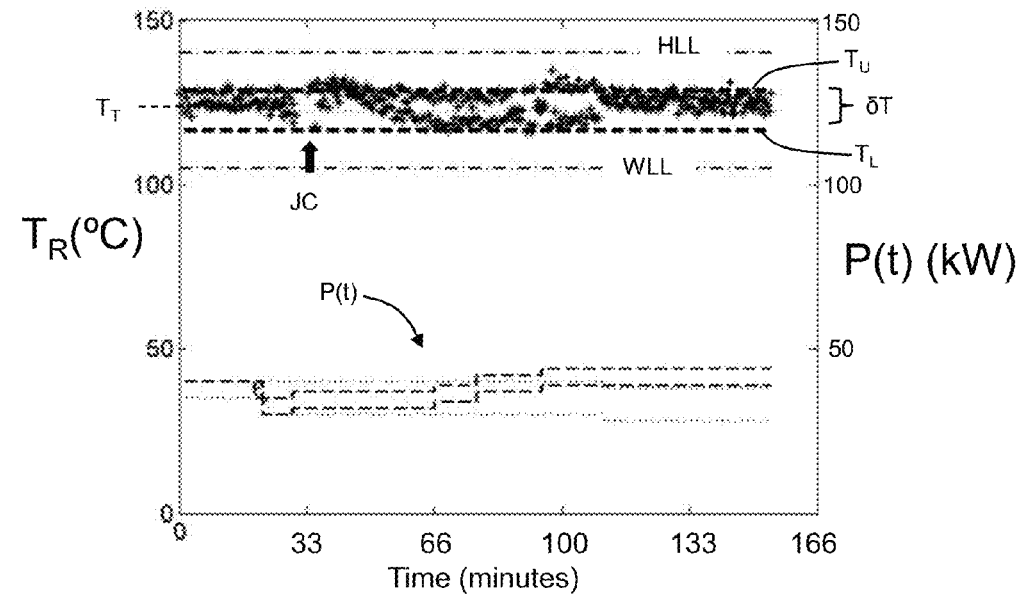
FIG. 7B is the same plot as FIG. 7A but for the automated model-based microwave-drying process disclosed here, where the microwave power profile P(t) is automatically adjusted based on a transient drying model for the log-drying process to quickly bring the drying process to a steady state.

FIGS. 7A and 7B are plots of pack-off log temperature $T_R$ (° C.) and applied microwave power profile P(t) (kW) versus time. FIG. 7A shows the prior-art method of manually changing microwave power 40, while FIG. 7B shows the method of changing the microwave power profile P(t) automatically using controller 150 and reduced-transient-drying control process 200 disclosed herein. The two sets of data are for a system 10 having two drying lines DL1 and DL2, such as is shown in FIG. 4. The target temperature $T_T$ is shown, along with the upper and lower temperature limits $T_U$ and $T_L$ around the target temperature that define the temperature (tolerance) band $\delta T$. The hot-log limit HLL and the wet-log limit WLL are also shown and define defect temperature limits. The arrow labeled JC denotes a "job change" that caused a temporary break in the data. There are two dashed and two dotted curves for the power profile P(t), with the two dashed lines indicating the power profiles for the last and next-to-last applicators in one of the output dryers 20B (say, 20Ba) and the two dotted lines indicated the power profiles for last and next-to-last applicators the other output dryer (say, 20Bb). Note that in some instances the dashed and dotted power profiles overlap.

FIG. 7A shows that with the prior-art method of manually changing microwave power 40, the log temperatures $T_R$ at the pack-off position 63 do not reach steady-state and are very close to the hot-log limit HLL, which defines one of the defect limits. The microwave power 40 is manually reduced after about 2.5 hours to bring the pack-off log temperatures $T_R$ down slightly.

FIG. 7B shows that the pack-off log temperature $T_R$ reaches target temperature $T_T$ much faster than in the manual process of FIG. 7A and also stays within the target band δT. This is primarily due to the fact that transient drying model 230 computes power adjustments that reduce or eliminate the temperature transients. Based on multiple validation trials, in comparison with the manual method, system 10 under the automated operation of controller 150 is capable of reducing the time it takes a given partially dried log 100' to reach a steady-state drying temperature by an average of about 36%. Also, experimental runs show that the number of log losses due to manufacturing errors can be reduced by up to about 43% compared to the losses incurred during the completely manual microwave drying process.

Hybrid Control Process

In an example aspect of the systems and methods disclosed herein, the transient control of the microwave drying process is tied into the steady-state portion of the microwave drying process. This can be accomplished as follows. First, the drying process is initiated in system 10, with reduced-transient-drying control process 200 being implemented as described above. During the time when the microwave drying process has not yet reached a steady state, reduced-transient-drying control process 200 modifies the microwave power profiles P(t) for at least the last two applicators 30B in output dryer(s) 20B to bring the drying process to a steady state at a rate faster than if the process were managed manually.

Once the drying process reaches a steady state, controller 150 initiates a hybrid control process that monitors the steady-state operation regime of the microwave drying process. A supervisory layer of the control algorithm continuously monitors for any changes made to the microwave power profile P(t) of the first two applicators 30B of output dryer(s) 20B. If there are no changes, then the process determines whether there have been any microwave power profile changes of greater than 3 kW to the second-to-last applicator 30B of output dryer 20B. If there have been such changes, then the hybrid control process is reset and the process returns to the point just after reduced-transient-drying control process 200 is initiated. Likewise, if the changes to the microwave power profile P(t) were made to the first two applicators 30B of output dryer 20B, then the hybrid control process is reset and returns to the point just after reduced-transient-drying control process 200 is initiated. The hybrid control is initiated again only after reduced-transient-drying control process 200 gets the drying process to a steady-state operation regime.

The hybrid control process is primarily used to control the steady-state operation regime of the microwave drying process. It incorporates a combination of fuzzy logic-based feed-forward control and first principles model-based feedback control. It compensates for load and composition variations during steady-state operation of the microwave drying process. The primary objective of the hybrid control process is to reduce the steady-state process variations and steady-state process losses.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A method of reducing transient temperature variations in a microwave drying process for drying partially dried ceramic logs, comprising:
    sending the logs through at least one output microwave dryer having an input end, an output end and multiple applicators, each applicator being capable of generating an adjustable amount of microwave power, including a maximum amount of microwave power;
    applying the adjustable amount of microwave power to the logs;
    employing a transient drying model based on microwave-drying process parameters to determine a predicted log exit temperature $T_{PE}$ at the output end of the at least one output microwave dryer, wherein an amount of dissipated power for each log is estimated based on the maximum amount of microwave power;
    estimating a target exit temperature $T_{TE}$ for each log that exits the output end of the at least one output microwave dryer; and
    adjusting the transient drying model to adjust the amount of maximum microwave power applied to the logs based on a difference between the predicted log exit temperature $T_{PE}$ and the estimated exit target temperature $T_{TE}$;
    wherein the at least one output microwave dryer includes first and second output microwave dryers, further including sending a first set of the logs through the first output microwave dryer, a second set of the logs through the second output microwave dryer and employing a model to estimate the target exit temperatures $T_{TE}$ of the first and second output microwave dryers;
    wherein the estimated target exit temperatures $T_{TE}$ are used to distinguish between the exit temperatures of the first and second sets of logs.

2. The method of claim 1, further comprising forming the partially dried ceramic logs from wet ceramic logs by passing the wet ceramic logs through at least one input dryer.

3. The method of claim 1, wherein a controller runs the transient drying model.

* * * * *